United States Patent
Poe

[11] 3,995,506
[45] Dec. 7, 1976

[54] POWER TRANSMISSION BELT

[76] Inventor: Norman Poe, 6260 Magnolia St., Philadelphia, Pa. 19144

[22] Filed: June 26, 1975

[21] Appl. No.: 590,482

[52] U.S. Cl. .................. 74/231 MB; 74/231 C; 74/232
[51] Int. Cl.² .................. F16G 1/26; F16G 1/28
[58] Field of Search .......... 74/231 MB, 231 C, 232; 156/137

[56] References Cited
UNITED STATES PATENTS

| | | | |
|---|---|---|---|
| 2,057,419 | 10/1936 | Crush | 74/232 X |
| 2,220,869 | 11/1940 | Wehner | 74/231 MB |
| 2,479,929 | 8/1949 | Harris | 74/231 MB UX |
| 2,496,047 | 1/1950 | Goddard | 74/231 MB X |
| 2,971,392 | 2/1961 | Case | 74/231 C |
| 3,017,671 | 1/1962 | Poeschl | 74/232 X |
| 3,859,864 | 1/1975 | Offermann | 74/231 C X |

*Primary Examiner*—Leonard H. Gerin
*Attorney, Agent, or Firm*—Larry Harbin; Joseph A. Finlayson, Jr.

[57] ABSTRACT

A power transmission belt having the form of a Mobius strip with a single half twist consisting of a laminated structure assembled from a single strip of flexible material. The flexible material may be an adhesive tape or similar material having an adhesive surface on one side thereof, and a friction surface on the other side thereof. The laminated structure is assembled by first, forming an open loop with a first end portion of the flexible strip of material, and secondly, twisting said end portion 180° about its longitudinal axis so as to place the adhesive surface of the twisted end in intimate face-to-face contact with the adhesive surface of a remaining portion of the flexible material, and thirdly, pressing together the adhesive surfaces of the remaining portion of the strip of material and the closed preformed loop in a manner whereby a laminated structure is formed from several congruent layers of said flexible material.

6 Claims, 9 Drawing Figures

POWER TRANSMISSION BELT

BACKGROUND OF THE INVENTION

1. Field of the Invention

This invention is related to a particular type of power transmission belt in the form of a Mobius strip, but more specifically relating to a power transmission Mobius belt made from a single strip of flexible material wherein the assembled structure consists of several laminae.

2. Description of Prior Art

The transmission of circulatory mechanical energy from one location to another is conventionally accomplished by at least a pair of pulleys and its associated power transmission belt or belts. The power transmission belts generally employed for such purposes are usually made from a flexible material such as rubber or plastic, which have desirable friction properties for use in power transmission. The conventional power transmission belt has at least two different surfaces wherein at least one surface of the belt is in constant continuous contact with the pulley from which the mechanical energy is generated and a pulley to which the mechanical energy is transmitted, and at least one other surface that does not come into contact with either pulley. This type of arrangement does not provide for the maximum usage of the material from which the drive belt is made as the surface of the belt which does not come into contact with the pulley is not being used thereby not contributing to the useful life of the entire belt. Consequently, in order to utilize all of the material of the power transmission belt, a Modius power transmission belt was developed, as shown in U.S. Pat. No. 2479929 issued to Harris on Aug. 23, 1949. This type of belt provided many advantages over the prior art in that because of the unique characteristic of a Modius strip, both sides or every portion of the surface of the belt came into contact with the drive pullies during its operation thereby providing the means for utilizing a substantial amount of the material from which the belt is made. Theoretically, a Modius belt has only one side, but for purposes of explanation and description of the present invention, any reference to the two different sides of the Modius belt should be correctly understood as meaning the opposed surfaces.

Another form of a Mobius power transmission belt is shown in U.S. Pat. No. 3,589,463 issued to Stowers on June 29, 1971, wherein a power drive mechanism consists of a Mobius drive belt system wherein the belt has grooves or teeth on the opposed surfaces.

The instant invention is concerned with a Mobius belt made in a particular manner, that is, from a single strip of flexible material wherein the assembled structure contains several laminae. The advantage in this structure resides in continuity and superior mechanical integrity of the assembled structure which renders longer life, greater wear resistance and higher tensil strength.

Laminated power trnasmission belts, not possessing Mobius characteristics, are well known in the art, such as suggested by U.S. Pat. No. 3,436,978 issued to Rahmes on Apr. 8, 1969. The power transmission belt shown therein is constructed from several pieces of a tape-like material adhered together in offset lengthwise relationship wherein the exposed adhesive ends are joined together to complete the formation of the belt. Not only does this belt lack the characteristic of a Mobius strip, but contains a connective joint-like structure within the belt loop which renders it susceptible to failures and uneven wear.

Other laminated power transmission belts having laminated structures, but not having Mobius characteristics, are shown in U.S. Pat. No. 3,673,023 and U.S. Pat. No. 2,256,756.

In view of the foregoing, it is a primary purpose of this invention to produce a power transmission belt of the Mobius type from a single strip of flexible material in laminated form.

Another purpose of this invention is to form a power transmission belt with high tensil strength and good mechanical integrity.

Other objects of this invention will become readily apparent in view of the following description and appended claims.

SUMMARY OF THE INVENTION

The invention as disclosed herein relates to a power transmission belt formed from a single strip of flexible material having an adhesive surface on one side thereof and a friction surface on the other side thereof. The friction surface may contain teeth or grooves to cooperate with associated pulleys to further reduce the possibility of belt slip on the surface of the pulleys.

The power transmission belt mentioned herein can best be described by the method of its formation. The laminated belt structure is made by first forming an open loop with one end portion of the flexible strip, then twisting said end portion 180 degrees about its longitudinal axis before pressing together the adhesive surface of said end portion and the adhesive surface of the remainder of the flexible strip to close the loop. The adhesive surface of remainder of the flexible strip is pressed upon the adhesive surface of the preformed loop in a congruent fashion and the number of laminations depends upon the length of the remaining portion of the flexible material. For a relatively long strip of flexible material and a proportionately small loop size, a large number of laminations may be obtained, if desired. It should be noted that for the best results, only two laminations should be employed so as to render a belt having a constant thickness throughout its entire length; however, whenever a discontinuity in thickness in the belt is not critical for its particular application in use, more than two laminations may be employed to provide higher tensil strength.

The invention may be more fully understood with reference to the drawings wherein:

DETAILED DESCRIPTION OF THE INVENTION

Since the belt as described herein may be formed by several different procedures, and only the most apparent method will be described herein, it should be noted that it is not the intention of the applicant to limit the invention to the particular manner in which the belt is formed as herein described and illustrated, but to include those numerous modifications and adaptations which would be obvious to a person skilled in the art to which this subject matter pertains.

For purposes of description, only a belt having a smooth friction surface will be described herein, however, it is not the intention of the applicant to limit the invention thereto, but to also include such variations of the surface as grooves, teeth or holes or similar type of anti-skid or anti-slip implements to co-act with associated pulleys.

The subject matter of this invention is an apparatus which may be best described by the method of its formation since the belt in its final assembled form is similar to that disclosed by the prior art. As previously stated, the gist of this invention resides in the idea of forming a Mobius power transmission belt from a single strip of flexible material wherein the final product has several laminae having uniformed continuity, high tensil strength, and the desired mechanical integrity.

Figure 1:
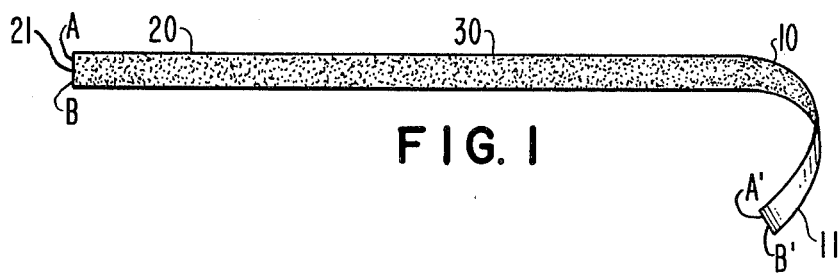
FIG. 1 shows a strip of flexible material having an adhesive surface and a friction surface.
Figure 2:
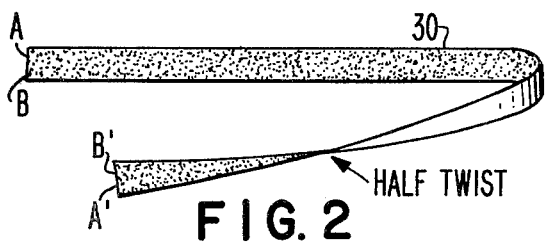
FIG. 2 shows an illustration of the initial process of bending and twisting one end of the strip of flexible material shown in FIG. 1.
Figure 3:
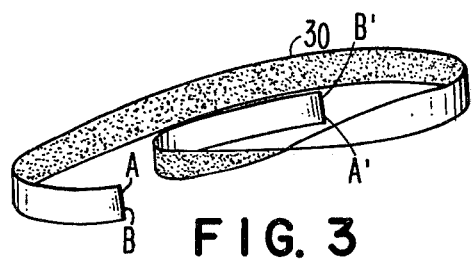
FIG. 3 shows an illustration of a first intermediate process in forming the belt of the instant invention.
Figure 4:
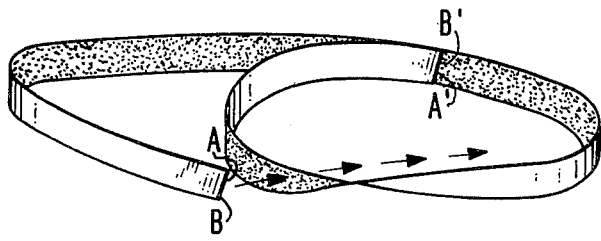
FIG. 4 shows an illustration of a second intermediate step during the process of forming the belt of the instant invention.
Figure 5:
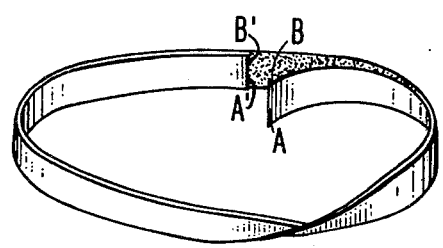
FIG. 5 shows an illustration of the final process of forming the belt of the instant invention.

Now, referring to FIGS. 1 through 5, the Mobius belt of the present invention can be formed by bending one end portion of the strip of flexible material so as to form an open loop having the adhesive surface on the inside of the loop while at the same time twisting the end 11 of the strip 180 degrees about its longitudinal axis and forming a closed loop as shown by the steps clearly illustrated in FIGS. 1, 2, and 3. When end 11 is twisted in this manner, the adhesive surface thereof will face the adhesive surface of the remainder of the strip as the loop is completed. More particularly, the corners A' and B' of the strip of FIG. 1 becomes inverted with reference to the original disposition during the initial process as shown in FIG. 2. As the loop is formed, the end corners B' and A' remain in an inverted position and are pressed against the adhesive inner surface of the loop at the mid section 30 of the strip of flexible material in a lengthwise congruent manner. Once the adhesive connection is made at mid-section 30, the adhesive surface of the remainder of the flexible material is joined in intimate face-to-face contact on the adhesive surface of the loop, as shown in FIG. 4 and in FIG. 5. FIG. 5 illustrates the Mobius belt in a nearly completed form wherein corner B' is complementary with corner B and corner A' is complementary with corner A.

Figure 6:
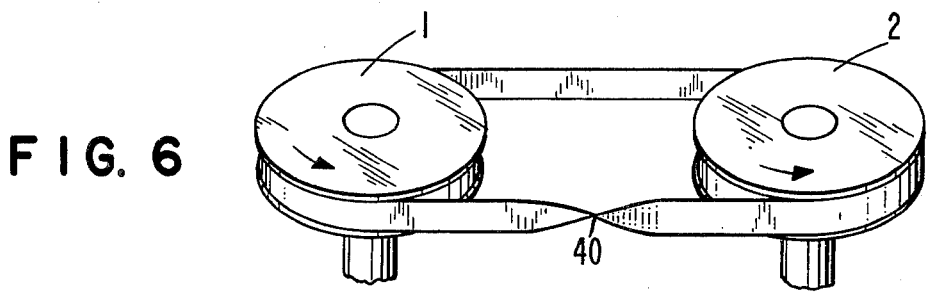
FIG. 6 shows the belt of the instant invention in its assembled form co-acting with a pair of power drive pulleys.

Referring to FIG. 6, the Mobius belt is shown in assembled relation co-acting with a pair of mechanical drive pulleys 1 and 2. As the drive pulleys 1 and 2 rotate, the half twist 40 in the Mobius belt remains in a substantially stationary position. Both of the opposed surfaces of the Mobius belt come into contact with the surfaces of the drive pulleys as the belt is rotated thereby providing means for even wear on both opposed sides of the strip resulting in more efficient use of the material from which the belt is made, and less frequent intervals between replacing the belts. When only a double laminated structure is formed and the opposed ends of the strip of flexible material are aligned, the belt has an even thickness throughout its entire length and is not likely to disassemble under force due to the concomitant mechanical operating stress when the power transmission system is fully operational.

Figure 7:
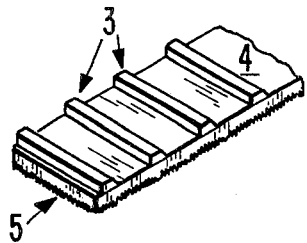
FIG. 7 shows a portion of a strip of material having teeth of which the belt of the present invention may be made.
Figure 9:
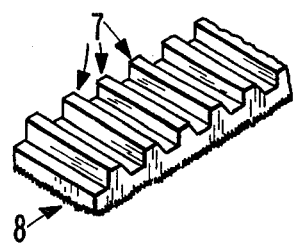
FIG. 9 shows a portion of a strip of material having teeth or grooves which the belt of the present invention may be made.

Referring to FIG. 7, there is shown a portion of a strip of material having teeth 3 mounted upon friction surface 4 for co-acting with a complementary pully (not shown) as an improvement upon the belt described previously. FIG. 9 shows a similar structure.

Figure 8:
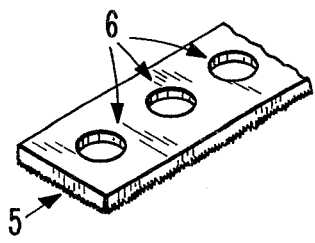
FIG. 8 shows a portion of a strip of material having holes of which the belt of the present invention may be made.

FIG. 8 shows another type of flexible material having holes 6 for co-acting with pulleys (not shown) having spikes mounted thereon for transmitting mechanical power through the belt.

The invention as previously described clearly shows a laminated drive belt for transmitting power through pulleys or the like having a half-twist and being formed from a single strip of flexible material. The resulting laminated belt has superior advantages over the belts of the prior art as previously mentioned. Only one procedure or method has been disclosed for making the belt of the present invention. It is not the intention of the applicant to limit the invention to that single procedure as described or illustrated, but to encompass the idea of making a laminated Mobius belt from a single strip of flexible material and those numerous modifications and improvements which may be made by one ordinarily skilled in the art to which this subject matter pertains.

Now therefore, a complete description of the invention having been made, what is claimed is:

1. A power transmission belt having an odd number of half-twists consisting of a laminated structure assembled from a unitary strip of flexible material having an adhesive surface on one side thereof for holding together said laminae and a friction surface on a second side thereof for transmitting mechanical power.

2. The invention of claim 1 wherein said laminated structure consists of two layers wherein the respective ends of the flexible strip are disposed in an abutting relationship when said belt is in an assembled position.

3. The invention of claim 1 wherein the strip of flexible material contains teeth to be geared with an associated pully.

4. The invention of claim 1 wherein said belt contains a single half-twist.

5. A method of making a power transmission belt from a unitary strip of flexible material having an adhesive surface on one side thereof and an anti-slip surface on a second side thereof consisting of the steps of twisting a first end portion of the flexible strips of material on odd multiple of 180 degrees about its longitudinal axis, forming an open loop with said twisted first end portion, closing said loop by connecting the adhesive surface of the first end portion with the adhesive surface of a portion of the flexible strip of material, and joining the adhesive surface of the remainder of the flexible material with the adhesive surface of the preformed loop.

6. A power transmission belt having an odd number of half-twist consisting of a double laminated structure formed from a unitary strip of flexible material having an adhesive surface and a friction surface, a first end and a second end, a respective first half portion and a second half portion, a mid section which separates said respective first and second half portions and is disposed substantially in the middle of said single strip of flexible material, wherein said structure is formed by bending said first half portion of said material in the direction of the adhesive surface 360° into a substantially circular disposition, twisting said first end portion associated with said first half portion 180° about the longitudinal axis of said strip of flexible material, pressing together the adhesive surface of said first end portion onto the adhesive surface of the mid section of said strip of flexible material in a substantially aligned and congruent disposition, and continuing to press together the adhesive surface of said second half portion upon the adhesive surface of said first half portion in a substantially aligned and congruent manner beginning at said mid section and continuing along said second half portion until said second end portion is aligned with said first end portion on the adhesive surface at the mid section of said flexible strips of material.

* * * * *